United States Patent
Han et al.

(10) Patent No.: US 9,829,146 B2
(45) Date of Patent: Nov. 28, 2017

(54) METHOD OF MANUFACTURING VACUUM INSULATION USING GLASS FIBERS

(71) Applicant: LG HAUSYS, LTD., Seoul (KR)

(72) Inventors: Jung Pil Han, Ulsan (KR); Sung Seock Hwang, Cheongju-si (KR); Seung Min Jeon, Busan (KR); Byung Hoon Min, Busan (KR)

(73) Assignee: LG Hausys, Ltd., Seoul (KR)

( * ) Notice: Subject to any disclaimer, the term of this patent is extended or adjusted under 35 U.S.C. 154(b) by 476 days.

(21) Appl. No.: 14/390,591

(22) PCT Filed: Apr. 9, 2013

(86) PCT No.: PCT/KR2013/002976
§ 371 (c)(1),
(2) Date: Oct. 3, 2014

(87) PCT Pub. No.: WO2013/154340
PCT Pub. Date: Oct. 17, 2013

(65) Prior Publication Data
US 2015/0096482 A1    Apr. 9, 2015

(30) Foreign Application Priority Data
Apr. 10, 2012  (KR) .......................... 10-2012-0037061

(51) Int. Cl.
*D21H 13/40*    (2006.01)
*F16L 59/04*    (2006.01)
(Continued)

(52) U.S. Cl.
CPC ................ *F16L 59/04* (2013.01); *B32B 5/06* (2013.01); *B32B 5/12* (2013.01); *B32B 5/26* (2013.01);
(Continued)

(58) Field of Classification Search
CPC . D21F 1/20; D21F 1/483; D21F 1/009; D21F 1/526; D21F 1/80; D21F 9/02;
(Continued)

(56) References Cited

U.S. PATENT DOCUMENTS 1,623,157 A * 4/1927 Berry ........................ D21F 1/00
162/349
4,055,460 A * 10/1977 Buchanan ................. D21F 1/20
162/209

(Continued)

FOREIGN PATENT DOCUMENTS

CN          101910702 A         12/2010
CN          102388253 A         3/2012
(Continued)

OTHER PUBLICATIONS

Machine translation of KR 20100091872 A.*
(Continued)

*Primary Examiner* — Jose Fortuna
(74) *Attorney, Agent, or Firm* — Dentons US LLP

(57) ABSTRACT

The present invention relates to an insulation used in home appliances and building materials. A method of manufacturing an insulation includes fabricating an adhesive solution by inputting a binder to water contained in a water tank, inputting long glass fibers to the adhesive solution, removing moisture by supplying the long glass fibers to a mesh belt, wherein the mesh belt move left and right and front and rear so that the long glass fibers are uniformly spread, fabricating glass fiber paper by drying the long glass fibers, winding the glass fiber paper in a roll form, and preparing the glass fiber paper rolls in multiple layers, stacking two or more sheets of the glass fiber paper supplied from the rolls, and sewing the sheets of stacked glass fiber paper.

6 Claims, 2 Drawing Sheets

(51) Int. Cl.

| | |
|---|---|
| *D21H 15/06* | (2006.01) |
| *D21H 27/30* | (2006.01) |
| *F16L 59/065* | (2006.01) |
| *B32B 5/26* | (2006.01) |
| *B32B 5/06* | (2006.01) |
| *B32B 5/12* | (2006.01) |
| *B32B 17/06* | (2006.01) |
| *B32B 27/08* | (2006.01) |
| *E04B 1/76* | (2006.01) |
| *E04B 1/80* | (2006.01) |

(52) U.S. Cl.
CPC ............ *B32B 17/067* (2013.01); *B32B 27/08* (2013.01); *F16L 59/065* (2013.01); *B32B 2262/101* (2013.01); *B32B 2307/304* (2013.01); *B32B 2315/08* (2013.01); *B32B 2419/00* (2013.01); *B32B 2509/00* (2013.01); *B32B 2509/10* (2013.01); *E04B 1/7662* (2013.01); *E04B 1/803* (2013.01); *F25D 2201/124* (2013.01); *F25D 2201/14* (2013.01)

(58) Field of Classification Search
CPC ........ D21H 13/40; D21H 15/06; D21H 27/34; D21H 5/1245; D21H 27/30; B32B 2307/304; B32B 7/12; B32B 2262/101; B32B 17/067; B32B 17/04; B32B 27/08; B32B 15/08; B32B 2315/08; B32B 5/06; B32B 5/12; E04B 1/7662; E04B 1/803; F16L 59/065; F16L 59/06; F16L 59/04; Y10T 428/24322; Y10S 428/92

See application file for complete search history.

(56) References Cited

U.S. PATENT DOCUMENTS

| | | | | | |
|---|---|---|---|---|---|
| 4,118,272 | A | * | 10/1978 | Ziegler | D21F 1/66 162/156 |
| 4,234,379 | A | * | 11/1980 | Conway | D21B 1/12 162/145 |
| 4,265,704 | A | * | 5/1981 | Nahta | D21H 13/40 162/156 |
| 4,294,655 | A | * | 10/1981 | Pfeffer | D21F 9/00 162/107 |
| 4,420,370 | A | * | 12/1983 | Saad | D21F 1/009 162/209 |
| 4,513,045 | A | * | 4/1985 | Bondoc | B32B 27/12 428/131 |
| 4,532,009 | A | * | 7/1985 | Nickerson | D21F 1/20 162/351 |
| 5,681,430 | A | * | 10/1997 | Neun | D21F 1/20 162/209 |
| 6,030,501 | A | * | 2/2000 | Neun | D21F 1/20 162/352 |
| 6,126,786 | A | * | 10/2000 | White | D21F 1/483 162/209 |
| 7,597,779 | B2 | * | 10/2009 | Gupta | D21F 1/20 162/156 |
| 8,152,968 | B2 | * | 4/2012 | Meuser | D21F 9/00 162/266 |
| 8,845,862 | B2 | * | 9/2014 | Shirao | D21F 9/00 162/289 |
| 9,404,663 | B2 | * | 8/2016 | Jeon | F24B 1/24 |
| 9,523,459 | B2 | * | 12/2016 | Min | F16L 59/065 |
| 2002/0121354 | A1 | * | 9/2002 | Aidun | D21F 1/20 162/216 |
| 2004/0099178 | A1 | * | 5/2004 | Jones | C08B 11/20 106/18.21 |
| 2004/0149415 | A1 | * | 8/2004 | Bricco | D21F 1/20 162/355 |
| 2005/0161186 | A1 | * | 7/2005 | Amos | D21F 1/483 162/352 |
| 2006/0249267 | A1 | * | 11/2006 | Gupta | D21H 13/40 162/156 |
| 2009/0193756 | A1 | | 8/2009 | Kant et al. | |
| 2012/0164365 | A1 | * | 6/2012 | Jang | B32B 5/26 428/69 |
| 2014/0322477 | A1 | * | 10/2014 | Jeon | F24B 1/24 428/76 |
| 2015/0096482 | A1 | * | 4/2015 | Han | B32B 5/26 112/429 |
| 2015/0192238 | A1 | * | 7/2015 | Min | F16L 59/065 428/69 |
| 2016/0016380 | A1 | * | 1/2016 | Jeon | B32B 15/14 428/69 |

FOREIGN PATENT DOCUMENTS

| | | | |
|---|---|---|---|
| DE | 112008003548 T5 | | 3/2011 |
| JP | 07096563 A | | 4/1995 |
| JP | 2004011706 A | | 1/2004 |
| JP | 2005265038 A | | 9/2005 |
| JP | 2010242868 A | * | 10/2010 |
| KR | 91003089 B1 | | 5/1991 |
| KR | 1020050013503 A | | 2/2005 |
| KR | 10-2010-0091872 A | | 8/2010 |
| KR | 20100091872 A | * | 8/2010 |
| KR | 1020100091872 A | | 8/2010 |
| WO | 2011/045946 A1 | | 4/2011 |

OTHER PUBLICATIONS

Machine translation of JP 2010242868 A.*
Machine Trasnlation of JP 2010-242868, Published on Oct. 28, 2010.*

* cited by examiner

METHOD OF MANUFACTURING VACUUM INSULATION USING GLASS FIBERS

This application is a 35 USC §371 National Stage entry of International Application No. PCT/KR2013/002976, filed on Apr. 9, 2013, and claims priority of Korean Application No. KR 10-2012-0037061, filed Apr. 10, 2012, which are each hereby incorporated by reference in their entirety.

TECHNICAL FIELD

The present invention relates to an insulation using long glass fibers and a method of manufacturing the same and, more particularly, to an insulation using long glass fibers, wherein sheets of sheets of glass fiber paper in each of which the long glass fibers are horizontally arranged are stacked and sewed and a method of manufacturing the same.

Furthermore, the present invention relates to an insulation which can be used in building materials in addition to home appliances, such as refrigerants, and which is excellent in initial performance and simple in fabrication and is capable of improving an insulating effect.

BACKGROUND ART

In general, an insulation capable of maintaining heat against conduction and radiation is commonly used in a wall body or a ceiling in order to achieve an insulating effect. Asbestos, rock wool, Styrofoam, and polyurethane foam are used as the insulation.

However, when this conventional insulation is disused, an environment is polluted and cancer-causing agents are generated. For the reasons, a vacuum insulation using glass fibers has recently been developed and used.

This vacuum insulation is configured by surrounding several sheets of films on the outside of a porous heartwood in order to reduce internal pressure and then processing sealing. The vacuum insulation has no danger of dust particles when disusing the vacuum insulation, and the vacuum insulation can be applied to building materials and home appliances, such as a refrigerant and an electric rice cooker.

The vacuum insulation includes a casing material configured to include openings therein due to a porosity (80% or higher) and formed of a gas-blocking film for maintaining the openings in a vacuum state, a heartwood made of a porous material, received in the openings of the casing material, and configured to form vacuum spaces, and a getter configured to adsorb gas and moisture.

The casing material can be formed of a film formed by laminating a multi-layer polymer and aluminum. The heartwood is made of glass fibers, glass wool, or a silica core on which pre-processing processes have been performed so that heartwood has specific hardness and a desired size. The getter is kind of an air absorbent and a moisture absorbent for absorbing gas and/or moisture that are present within the casing or newly introduced.

This conventional vacuum insulation, however, is problematic in that it is difficult to maintain a vacuum state due to gas generated from the heartwood and external moisture and gas. As a result, the getter is expensive, thereby increasing the unit cost of production.

Furthermore, there are problems in that it is difficult to manufacture the vacuum insulation because the heartwood made of glass fibers or glass wool experiences needling or thermal compression processes and the vacuum insulation has low initial performance because long glass fibers forming the glass fibers are crossed each other in a vertical, horizontal, or slope form.

Meanwhile, an insulation made of conventional short glass fibers is problematic in that the short glass fibers are detached from the insulation during a transport or construction process or when the insulation is used for a long time and the detached short glass fibers enter a respiratory organ, thus having a bad influence on the human body.

DISCLOSURE

Technical Problem

The present invention has been made in view of the above problems, and it is an object of the present invention to provide an insulation and a method of manufacturing the same, which are capable of improving initial performance using glass fibers in which long glass fibers are arranged in a specific direction and are capable of maximizing an insulating effect, improving workability and productivity, and reducing the unit cost of production by stacking and sewing sheets of sheets of glass fiber paper in multiple layers.

Another object of the present invention is to provide an insulation and a method of manufacturing the same, which are capable of controlling a thickness of and insulation performance by selecting the number of sheets of stacked sheets of glass fiber paper if necessary.

Yet another object of the present invention is to provide an insulation and a method of manufacturing the same, which can prevent a toxic substance from entering a respiratory organ by using long glass fibers.

Technical Solution

An aspect of the present invention provides a vacuum insulation used in home appliances and building materials. The vacuum insulation includes glass fiber paper in which long glass fibers are horizontally arranged, wherein sheets of the glass fiber paper are stacked and sewed.

Furthermore, another aspect of the present invention provides a method of manufacturing an insulation, including fabricating an adhesive solution by inputting a binder to water contained in a water tank, inputting long glass fibers to the adhesive solution, removing moisture by supplying the long glass fibers to a mesh belt, wherein the mesh belt move left and right and front and rear so that the long glass fibers are uniformly spread, fabricating glass fiber paper by drying the long glass fibers, winding the glass fiber paper in a roll form, and preparing the glass fiber paper rolls in multiple layers, stacking two or more sheets of the glass fiber paper supplied from the rolls, and sewing the sheets of stacked glass fiber paper.

Advantageous Effects

First, the present invention is advantageous in that initial performance and an insulating effect can be improved because sheets of the sheets of glass fiber paper in which the long glass fibers are horizontally arranged.

Second, the present invention is advantageous in that the insulation can be easily manufactured, the unit cost of production for the insulation can be reduced, and a thickness of the insulation can be controlled if necessary because sheets of the sheets of glass fiber paper in which the long glass fibers are arranged in one direction are stacked and sewed.

Third, the insulation of the present invention is advantageous in that it is light in weight and can be used widely and it can minimize an environmental pollution.

Fourth, the insulation of the present invention is advantageous in that fibers never enter a respiratory organ because the long glass fibers are used.

DESCRIPTION OF REFERENCE NUMERALS OF PRINCIPAL ELEMENTS IN THE DRAWINGS

10: insulation 20: glass fiber paper
22: long glass fiber

MODE FOR INVENTION

Some exemplary embodiments of the present invention are described in detail below with reference to the accompanying drawings.

Figure 1:
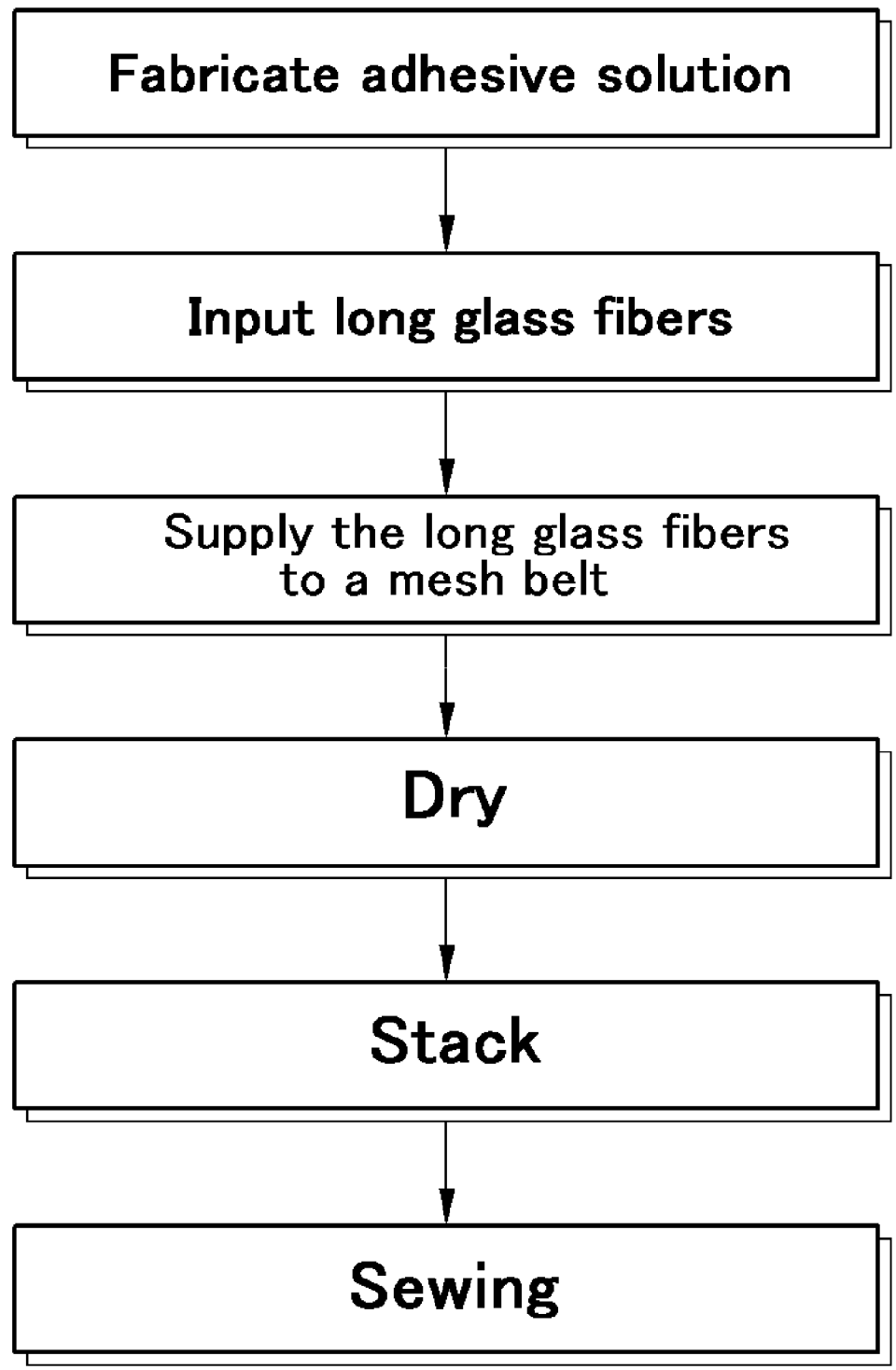
FIG. 1 is a flowchart illustrating a process of manufacturing a vacuum insulation in accordance with the present invention.
Figure 2:
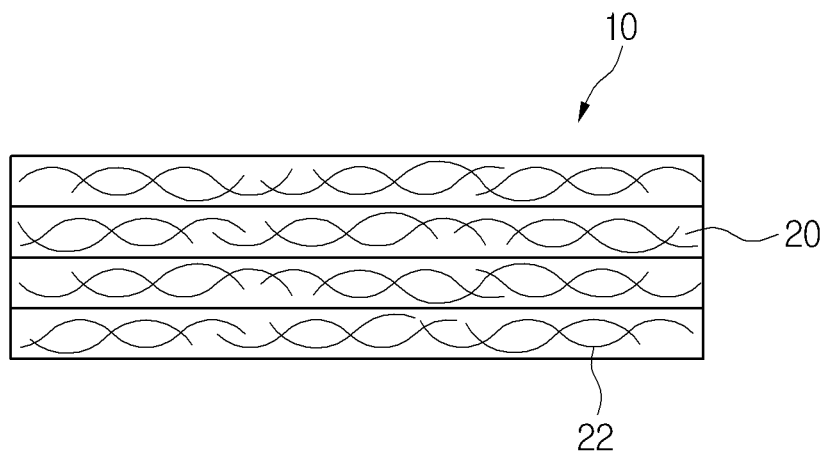
FIG. 2 is a cross-sectional view showing the vacuum insulation in accordance with the present invention.
Figure 3:
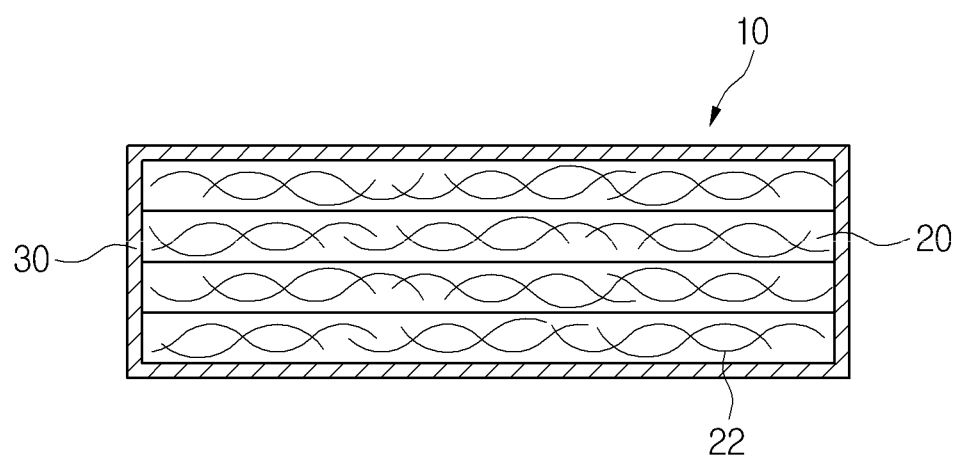
FIG. 3 is a cross-sectional view showing a vacuum insulation in accordance with another embodiment of the present invention.

FIG. 1 is a flowchart illustrating a process of manufacturing a vacuum insulation in accordance with the present invention, FIG. 2 is a cross-sectional view showing the vacuum insulation in accordance with the present invention, and FIG. 3 is a cross-sectional view showing a vacuum insulation in accordance with another embodiment of the present invention.

In the drawings, an insulation 10 according to the present invention can be applied to home appliances, such as a refrigerant and an electric rice cooker, in addition to building materials and can also be applied to several machines and electronic products.

A vacuum insulation 10 according to the present invention is manufactured by filling a water tank or a tank with water, composing an adhesive solution by mixing the water with a binder, inputting long glass fibers 22 to the adhesive solution so that the long glass fibers are adhered to the adhesive solution, removing moisture by supplying the long glass fibers to a mesh belt, and inputting the long glass fibers to a drier, thereby completing glass fiber paper 20.

The completed glass fiber paper 20 is wound by a winder in a roll form. In the state in which a plurality of sheets of the glass fiber paper 20 have been hung, the plurality of sheets of the glass fiber paper 20 is supplied to two or more sewing machines and sewed, thereby manufacturing the insulation 10 of the present invention.

The binder mixed with the water so that a viscous property is assigned to the long glass fibers 22 and the long glass fibers 22 are coagulated together can include various types, such as urethane resins, epoxy resins, phenol resins, and polyamides in addition to acrylic resin series. The binder of 1 to 20 wt % is mixed with the water of 100 wt %.

The long glass fiber 22 is a glass fiber and fabricated by ejecting the glass fiber in the form of a filament. That is, the long glass fiber 22 is manufactured by mixing agalmatolite, limestone, and boric acid stored in raw material silos at a composition ratio, manufacturing glass by heating the mixed raw materials at a high temperature of 1,500° C. or higher, and ejecting the molten glass in the form of a filament having a diameter of 7 μm or higher using bushing. In some embodiments, the ejected filament may be subject to surface processing using a binder and then dried.

In the present invention, the diameter of the long glass fiber is an average diameter for the length.

Furthermore, the long glass fiber 22 is cut in a length of 1 to 100 mm, inputted to the adhesive solution in which the water and the binder are mixed, and then processed.

The long glass fibers 22 inputted to the adhesive solution and coagulated together are supplied to a mesh belt and processed into the glass fiber paper 20. Here, the long glass fibers 22 having a viscous property are scooped up by the mesh belt that passes through the water tank or is supplied to the mesh belt by an additional supply hopper. The mesh belt is moved front and rear and left and right, that is, shaken to uniformly spread the long glass fibers. In this process, moisture is drained under the mesh belt.

Other types of machines and equipment may be used in addition to the mesh belt.

The long glass fibers spread in the mesh belt passes through the drier, thus becoming the glass fiber paper 20. Here, a dry temperature is 30 to 200° C., a low-temperature dry and high temperature dry method can be used, and a dry time can be 10 minutes to 3 hours depending on a temperature.

Furthermore, the glass fiber paper 20 preferably is formed to have a thickness of 0.1 to 2 mm. If the thickness is less than 0.1 mm, the density, strength, and insulation property of the glass fiber paper 20 are deteriorated. If the thickness is greater than 2 mm, the initial performance of the glass fiber paper 20 can be deteriorated because the long glass fibers can be made stand slantly or vertically.

In the present invention, sheets of the glass fiber paper 20 is combined together by a sewing method, thereby completing the insulation 10 of the present invention.

That is, the glass fiber paper 20 passing through the drier is wound by a winder in a roll form and then kept. When the insulation 10 is manufactured, plural layers of the glass fiber paper rolls are hung in the sewing machine or near the sewing machine, and two or more of the glass fiber paper rolls are inputted to the sewing machine.

Meanwhile, the insulation of the present invention can further include a coloring agent and flame retardants if necessary. The flame retardants can include water-soluble flame retardants, such as halogen flame retardants, bromine flame retardants or phosphorous flame retardants, and inorganic flame retardants. The flame retardants of 5 to 30 wt % on the basis of the water of 100 wt % can be included in the insulation.

The coloring agent of 0.1 to 5 wt % on the basis of the water of 100 wt % can be included in the insulation. Dioxide titanium, oxide zinc, carbon powder, calcium, magnesium, cadmium, or chromium can be used as the coloring agent.

Furthermore, FIG. 3 shows another embodiment of the present invention. In this embodiment, a casing 30 is surrounded on the outside of the sewed insulation 20.

The casing 30 functions to prevent sheets of the sewed glass fiber paper from being detached, facilitate transport, and make an external appearance beautiful. In some embodiments, the casing can be formed in the form of film paper.

Embodiments of the insulation according to the present invention are described in detail.

Embodiment 1

A water tank was filled with water. The acrylic resin binder was inputted to the water and then stirred, thereby completing the adhesive solution. Here, the binder o 8 wt % was mixed with the water of 100 wt %.

The long glass fiber cut in a length 10 to 20 mm was inputted to the adhesive solution and then stirred so that the adhesive solution could be absorbed into the long glass fibers.

Next, the long glass fibers were supplied to a mesh belt so that the long glass fibers could be spread on a top surface of the mesh belt that was shaken front and rear and left and right. The spread long glass fibers were dried at a dry temperature of 70° C. for 2 hours, thereby completing the glass fiber paper having a thickness of 1 mm.

Next, sheets of the glass fiber paper were supplied to a sewing machine and sewed, thereby completing the insulation. Ten sheets of the glass fiber paper were stacked to complete an insulation for home appliances.

Embodiment 2

Water of 100 wt %, the acrylic resin binder of 7 wt %, the coloring agent of 0.5 wt %, the flame retardants of 10 wt %, and the long glass fibers of 20 wt % and of 10 to 20 mm in length were mixed in a water tank. The long glass fibers were supplied to a mesh belt so that they were uniformly spread in the mesh belt that was shaken front and rear and left and right. Next, the spread long glass fibers were dried at a dry temperature of 70° C. for 2 hours, thereby completing glass fiber paper having a thickness of 1 mm.

Pieces of the glass fiber paper was supplied to a sewing machine and then sewed, thereby completing the insulation. 25 sheets of the glass fiber paper were stacked to complete the insulation for buildings.

The invention claimed is:

1. A method of manufacturing a vacuum insulation, comprising:
   fabricating an adhesive solution by inputting 1-20 parts by weight of a binder, 5-30 parts by weight of flame retardants, and 0.1-5 parts by weight of a coloring agent to 100 parts by weight of water contained in a water tank;
   inputting glass fibers having a length of 20-100 mm to the adhesive solution;
   removing moisture by supplying the glass fibers to a mesh belt, wherein the mesh belt moves left and right and front and rear so that the glass fibers are uniformly spread;
   fabricating a glass fiber paper having a thickness of 0.5-2 mm by drying the glass fibers at 30-200° C.;
   winding the glass fiber paper in a roll form; and
   preparing the glass fiber paper rolls in multiple layers, stacking two or more glass fiber papers supplied from the rolls, and sewing the stacked glass fiber papers.

2. The method of claim 1, wherein the binder comprises any one of acrylic resin series, PVA series, urethane resins, epoxy resins, phenol resins, a polyamides.

3. The method of claim 1, wherein:
   the glass fiber is fabricated by ejecting molten glass in a filament using bushing, and
   the glass fiber has an average diameter of 7 μm or higher.

4. The method of claim 1, wherein the coloring agent comprises one or more of dioxide titanium, oxide zinc, carbon powder, calcium, magnesium, cadmium, and chromium.

5. The method of claim 1, wherein the flame retardants comprises one or more of halogen flame retardants, bromine flame retardants or phosphorous flame retardants, and inorganic flame retardants.

6. A method of manufacturing a vacuum insulation, comprising:
   fabricating an adhesive solution by mixing 100 parts by weight of water, 1-20parts by weight of an acrylic resin binder, 5-30 parts by weight of flame retardants, and 0.1-5 parts by weight of a coloring agent in a water tank;
   inputting glass fibers of 20 to 40 mm in length to the adhesive solution so that the glass fibers are coagulated together;
   supplying the glass fibers to a mesh belt so that the glass fibers are uniformly spread in the mesh belt shaken front and rear and left and right;
   fabricating a glass fiber paper having a thickness of 0.5 to 2 mm by drying the glass fibers on a top surface of the mesh belt in a dry temperature of 30 to 200° C. ; and
   stacking two or more of said glass fiber papers and sewing the two or more stacked glass fiber papers.

* * * * *